(12) United States Patent
Graham et al.

(10) Patent No.: US 9,849,370 B2
(45) Date of Patent: *Dec. 26, 2017

(54) CUSTOM GAME BOARDS

(71) Applicant: Zynga Inc., San Francisco, CA (US)

(72) Inventors: M. Ian Graham, San Francisco, CA (US); Ya-Bing Chu, Burlingame, CA (US); Randall William Allred, Jr., San Francisco, CA (US); Christopher Delbuck, Berkeley, CA (US); Jonathan Sheng Chao, San Francisco, CA (US); Vladimir Loktev, San Francisco, CA (US); Amanda Carrico Schloss, Foster City, CA (US); Seth Alexander Allison, San Francisco, CA (US); Andres Cantor, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,479

(22) Filed: Dec. 30, 2015

(65) Prior Publication Data

US 2016/0107073 A1 Apr. 21, 2016

Related U.S. Application Data

(63) Continuation of application No. 13/436,112, filed on Mar. 30, 2012.

(51) Int. Cl.
*A63F 13/00* (2014.01)
*G06F 17/00* (2006.01)
(Continued)

(52) U.S. Cl.
CPC .......... *A63F 3/00895* (2013.01); *A63F 13/35* (2014.09); *A63F 13/60* (2014.09);
(Continued)

(58) Field of Classification Search
CPC ........ A63F 13/61; A63F 13/77; A63F 13/792; G06Q 30/02; G06Q 30/0209
See application file for complete search history.

(56) References Cited

U.S. PATENT DOCUMENTS 6,231,441 B1 5/2001 Golad
6,830,513 B1 12/2004 Ballard
(Continued)

OTHER PUBLICATIONS

"U.S. Appl. No. 13/433,603, Non Final Office Action dated Jan. 6, 2016", 14 pgs.

(Continued)

*Primary Examiner* — Lawrence Galka
(74) *Attorney, Agent, or Firm* — Schwegman Lundberg & Woessner, P.A.

(57) ABSTRACT

A system, computer-readable storage medium storing at least one program, and a computer-implemented method for providing custom features in a game is provided. A themed game board associated with a first set of rules of a computer-implemented game is generated. The first set of rules relates to a theme of the themed game board and is different than a second set of rules associated with a game board without a theme. Game board display data is provided to a first client device of a first player to display the themed game board. A move on the themed game board is received from the first client device, and a score associated with the move is generated. The score is based on the first set of rules relating to the theme, where the score is different than a score associated with the move on the game board without a theme.

20 Claims, 10 Drawing Sheets

(51) Int. Cl.
| | |
|---|---|
| G06F 19/00 | (2011.01) |
| A63F 3/00 | (2006.01) |
| A63F 13/61 | (2014.01) |
| G06Q 30/02 | (2012.01) |
| A63F 13/35 | (2014.01) |
| A63F 13/60 | (2014.01) |

(52) U.S. Cl.
CPC ............ *A63F 13/61* (2014.09); *G06Q 30/02* (2013.01); *G06Q 30/0209* (2013.01); *A63F 2003/00996* (2013.01)

(56) References Cited

U.S. PATENT DOCUMENTS

| | | | |
|---|---|---|---|
| 7,632,186 | B2 | 12/2009 | Spanton et al. |
| 7,828,661 | B1 | 11/2010 | Fish et al. |
| 8,314,793 | B2 | 11/2012 | Beckman et al. |
| 9,254,443 | B1 | 2/2016 | Graham et al. |
| 9,446,321 | B1 | 9/2016 | Graham et al. |
| 2004/0235546 | A1 | 11/2004 | Ballard |
| 2004/0242332 | A1 | 12/2004 | Walker et al. |
| 2006/0046816 | A1 | 3/2006 | Walker et al. |
| 2006/0068870 | A1 | 3/2006 | Crawford, III et al. |
| 2006/0205472 | A1 | 9/2006 | Sines et al. |
| 2007/0005704 | A1 | 1/2007 | Heron et al. |
| 2007/0117617 | A1 | 5/2007 | Spanton et al. |
| 2007/0243928 | A1 | 10/2007 | Iddings |
| 2008/0026826 | A1 | 1/2008 | Groswirt |
| 2008/0102923 | A1 | 5/2008 | Esses et al. |
| 2009/0005145 | A1 | 1/2009 | White |
| 2009/0063463 | A1 | 3/2009 | Turner et al. |
| 2009/0094535 | A1 | 4/2009 | Bromenshenkel et al. |
| 2009/0198576 | A1 | 8/2009 | Rogers, Jr. |
| 2010/0004055 | A1 | 1/2010 | Gormley et al. |
| 2010/0041472 | A1 | 2/2010 | Gagner et al. |
| 2010/0041475 | A1 | 2/2010 | Zalewski et al. |
| 2010/0124959 | A1 | 5/2010 | Demsetz et al. |
| 2010/0217613 | A1 | 8/2010 | Kelly |
| 2010/0285858 | A1 | 11/2010 | Clowes et al. |
| 2011/0269548 | A1 | 11/2011 | Barclay et al. |
| 2011/0281648 | A1 | 11/2011 | Weising |
| 2012/0041907 | A1 | 2/2012 | Wang et al. |
| 2012/0303491 | A1 | 11/2012 | Hill et al. |
| 2013/0310125 | A1 | 11/2013 | Tsiounis |

OTHER PUBLICATIONS

"U.S. Appl. No. 13/433,603, Response filed Apr. 6, 2016 to Non Final Office Action dated Jan. 6, 2016", 9 pgs.
"U.S. Appl. No. 13/485,685, Examiner's Answer to Appeal Brief dated Jul. 6, 2015", 9 pgs.
"U.S. Appl. No. 13/485,685, Non Final Office Action dated Mar. 21, 2016", 14 pgs.
"U.S. Appl. No. 13/485,685, Response filed Feb. 29, 2016 to Final Office Action dated Dec. 15, 2015", 25 pgs.
Civilization V Manual, [Online]. Retrieved from Internet: <http://www.2kgames.com/manual/civ5/>>, (Apr. 25, 2011), 234 pgs.
"U.S. Appl. No. 13/436,112, Response filed Sep. 16, 2015 to Final Office Action dated May 19, 2015", 23 pgs.
"U.S. Appl. No. 13/433,603, Examiner Interview Summary dated Apr. 14, 2015", 5 pgs.
"U.S. Appl. No. 13/433,603, Examiner Interview Summary dated May 3, 2013", 4 pgs.
"U.S. Appl. No. 13/433,603, Final Office Action dated May 19, 2015", 19 pgs.
"U.S. Appl. No. 13/433,603, Final Office Action dated Sep. 13, 2013", 21 pgs.
"U.S. Appl. No. 13/433,603, Non Final Office Action dated Jan. 13, 2015", 23 pgs.
"U.S. Appl. No. 13/433,603, Non Final Office Action dated Feb. 12, 2013", 17 pgs.
"U.S. Appl. No. 13/433,603, Response filed Jan. 13, 2014 to Final Office Action dated Sep. 13, 2013", 11 pgs.
"U.S. Appl. No. 13/433,603, Response filed Apr. 13, 2015 to Non Final Office Action dated Jan. 13, 2015", 10 pgs.
"U.S. Appl. No. 13/433,603, Response filed Jun. 12, 2013 to Non Final Office Action dated Feb. 12, 2013", 14 pgs.
"U.S. Appl. No. 13/433,603, Response filed Aug. 19, 2015 to Final Office Action dated May 19, 2015", 15 pgs.
"U.S. Appl. No. 13/436,112, Examiner Interview Summary dated Jan. 27, 2014", 3 pgs.
"U.S. Appl. No. 13/436,112, Examiner Interview Summary dated Sep. 6, 2013", 3 pgs.
"U.S. Appl. No. 13/436,112, Final Office Action dated May 19, 2015", 23 pgs.
"U.S. Appl. No. 13/436,112, Final Office Action dated Dec. 11, 2013", 18 pgs.
"U.S. Appl. No. 13/436,112, Non Final Office Action dated Jan. 28, 2015", 19 pgs.
"U.S. Appl. No. 13/436,112, Non Final Office Action dated May 17, 2013", 16 pgs.
"U.S. Appl. No. 13/436,112, Notice of Allowance dated Sep. 30, 2015", 9 pgs.
"U.S. Appl. No. 13/436,112, Response filed Mar. 11, 2014 to Final Office Action dated Dec. 11, 2013", 10 pgs.
"U.S. Appl. No. 13/436,112, Response filed Apr. 28, 2015 to Non Final Office Action dated Jan. 28, 2015", 22 pgs.
"U.S. Appl. No. 13/436,112, Response filed Oct. 17, 2013 to Non Final Office Action dated May 17, 2013", 9 pgs.
"U.S. Appl. No. 13/485,685, Advisory Action dated Nov. 26, 2014", 3 pgs.
"U.S. Appl. No. 13/485,685, Appeal Brief filed Feb. 17, 2015", 23 pgs.
"U.S. Appl. No. 13/485,685, Decision on Pre-Appeal Brief Request dated Jan. 12, 2015", 2 pgs.
"U.S. Appl. No. 13/485,685, Examiner Interview Summary dated Sep. 19, 2013", 3 pgs.
"U.S. Appl. No. 13/485,685, Final Office Action dated Jun. 13, 2014", 14 pgs.
"U.S. Appl. No. 13/485,685, Final Office Action dated Nov. 15, 2013", 9 pgs.
"U.S. Appl. No. 13/485,685, Final Office Action dated Dec. 15, 2015", 13 pgs.
"U.S. Appl. No. 13/485,685, Non Final Office Action dated Feb. 25, 2014", 11 pgs.
"U.S. Appl. No. 13/485,685, Non Final Office Action dated Jun. 19, 2013", 9 pgs.
"U.S. Appl. No. 13/485,685, Pre-Appeal Brief Request filed Dec. 15, 2014", 6 pgs.
"U.S. Appl. No. 13/485,685, Response filed Feb. 10, 2014 to Final Office Action dated Nov. 15, 2013", 10 pgs.
"U.S. Appl. No. 13/485,685, Response filed May 13, 2014 to Non Final Office Action dated Feb. 25, 2014", 13 pgs.
"U.S. Appl. No. 13/485,685, Response filed Oct. 21, 2013 to Non Final Office Action dated Jun. 19, 2013", 9 pgs.
"U.S. Appl. No. 13/485,685, Response filed Nov. 13, 2014 to Final Office Action dated Jun. 13, 2014", 17 pgs.
"Infogames Scrabble Complete Manual", (2002), 16 pgs.
Dingus, Betty, "American Simpsons Scrabble vs. The British Version Board Game Geek", [Online] Retrieved From Internet: <http://boardgamegeek.com/filepage/28141/american-simpsons-scrabble-vs-the-british-version>, (Nov. 27, 2007).
Scrabulizer, "", [Online] Retrieved From Internet: <http://web.archive.org/web/20101231174841 /http://www.scrabulizer.com>, (Jan. 2, 2011).
"U.S. Appl. No. 13/433,603, Notice of Allowance dated May 20, 2016", 8 pgs.
"U.S. Appl. No. 13/485,685, Final Office Action dated Jun. 22, 2016", 16 pgs.
"U.S. Appl. No. 13/485,685, Response filed Apr. 26, 2016 to Non Final Office Action dated Mar. 21, 2016", 29 pgs.

CUSTOM GAME BOARDS

TECHNICAL FIELD

The present disclosure relates to games and applications in general and in particular to computer-implemented games. In an example embodiment, a game board for a computer-implemented game may have custom features relating to a particular theme.

BACKGROUND

The popularity of computer-implemented games is ever-growing, and this popularity has been recognized by many entities acquiring value through the popularity of these games. For example, advertising through the user interfaces for these games has become an effective way to market products and services to consumers playing these games.

While these games may be useful platforms for communicating to players, the effect of such communication is typically limited to the display of an advertisement, and little interaction with the players is involved.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Example systems and methods of providing customizable features of a game are described. In the following description, for purposes of explanation, numerous specific details are set forth in order to provide a thorough understanding of example embodiments. It will be evident, however, to one skilled in the art that the described systems and methods may be practiced without these specific details.

Players of one or more computer-implemented virtual games may be provided with the ability to play a game that supports customizable features. The customizable features may include aesthetic elements and/or functional elements. For example, the customizable features may relate to a particular theme, such as a seasonal Halloween theme. The aesthetic features of the game board may be customized to depict the particular theme. Any aesthetic features of a game may be customized in any manner to reflect a particular theme, including sound effects, the shape of the game board, the visual design of the interactive components, or the background of the game board. Additionally, the functional features of the game board may be customized to depict the particular theme. Any functional features of a game may be customized in any manner to reflect a particular theme. For example, in a word-based game, a customized dictionary relevant to a particular theme may contain an additional set of usable words in the game, which may or may not be usable in the standard rules of the game.

In some embodiments, a themed game board may be specific to a theme and provided to a player upon payment for the purchase of the themed game board. In some embodiments, the themed game board may be provided to a player as an incentive from a third-party entity. For example, a company promoting a product may indicate that a player may receive a themed game board if the player watches a video advertisement of the product. If the player watches the video, the company may instruct the game server of the game to provide the themed game board to the player. In some embodiments, the theme may relate to a product or service provided by the third-party entity.

Example System

Figure 1:
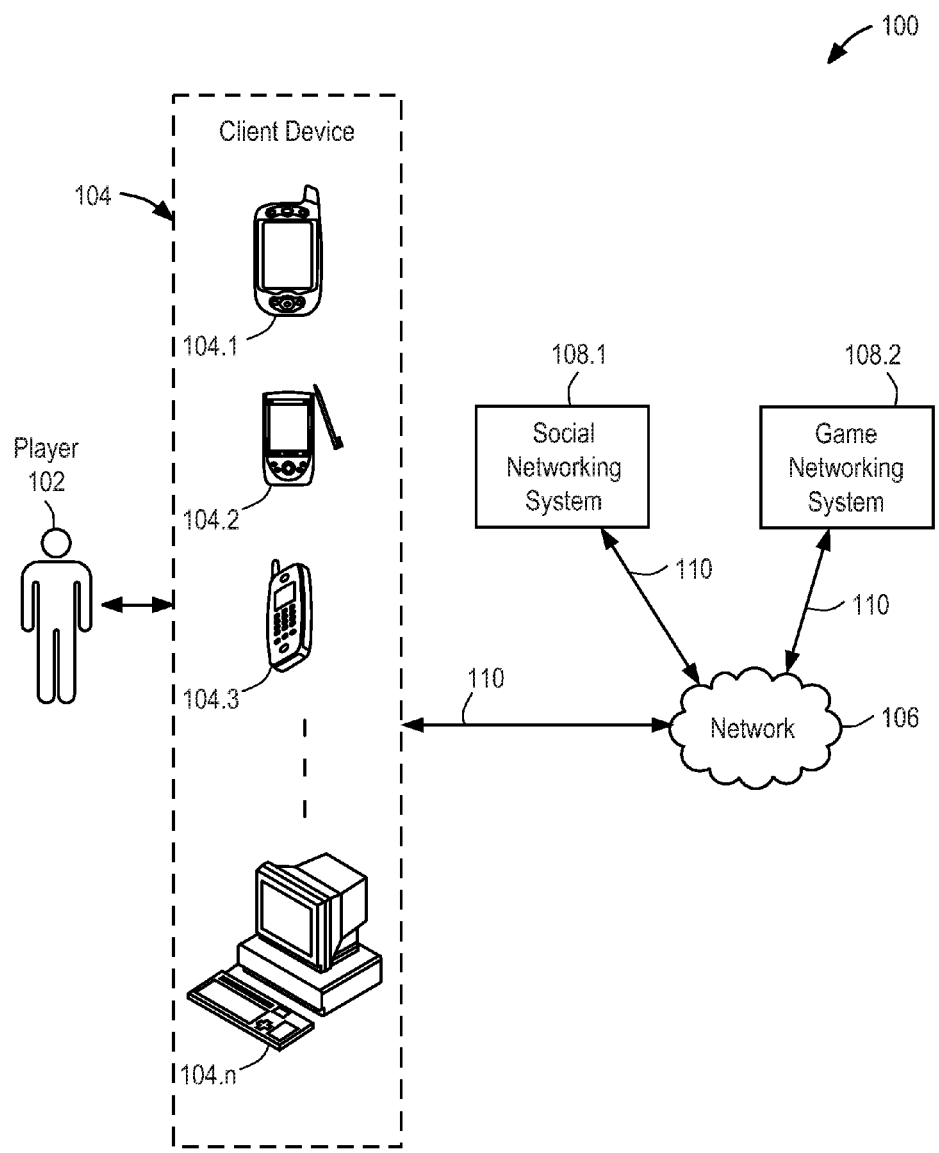
FIG. 1 is a schematic diagram showing an example of a system, according to some embodiments.

FIG. 1 is a schematic diagram showing an example of a system 100 for implementing various example embodiments. In some embodiments, the system 100 comprises a player 102, a client device 104, a network 106, a social networking system 108.1, and a game networking system 108.2. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1.

The social networking system 108.1 may include a network-addressable computing system that can host one or more social graphs (see for example FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2. In various example embodiments, the game networking system 108.2 may include an introduction mechanic that can introduce a player of the game networking system 108.2 to other players of the game networking system 108.2 that are encountering a common in-game obstacle.

Although FIG. 1 illustrates a particular example of the arrangement of the player 102, the client device 104, the social networking system 108.1, the game networking system 108.2, and the network 106, this disclosure includes any suitable arrangement or configuration of the player 102, the client device 104, the social networking system 108.1, the game networking system 108.2, and the network 106.

Figure 2:
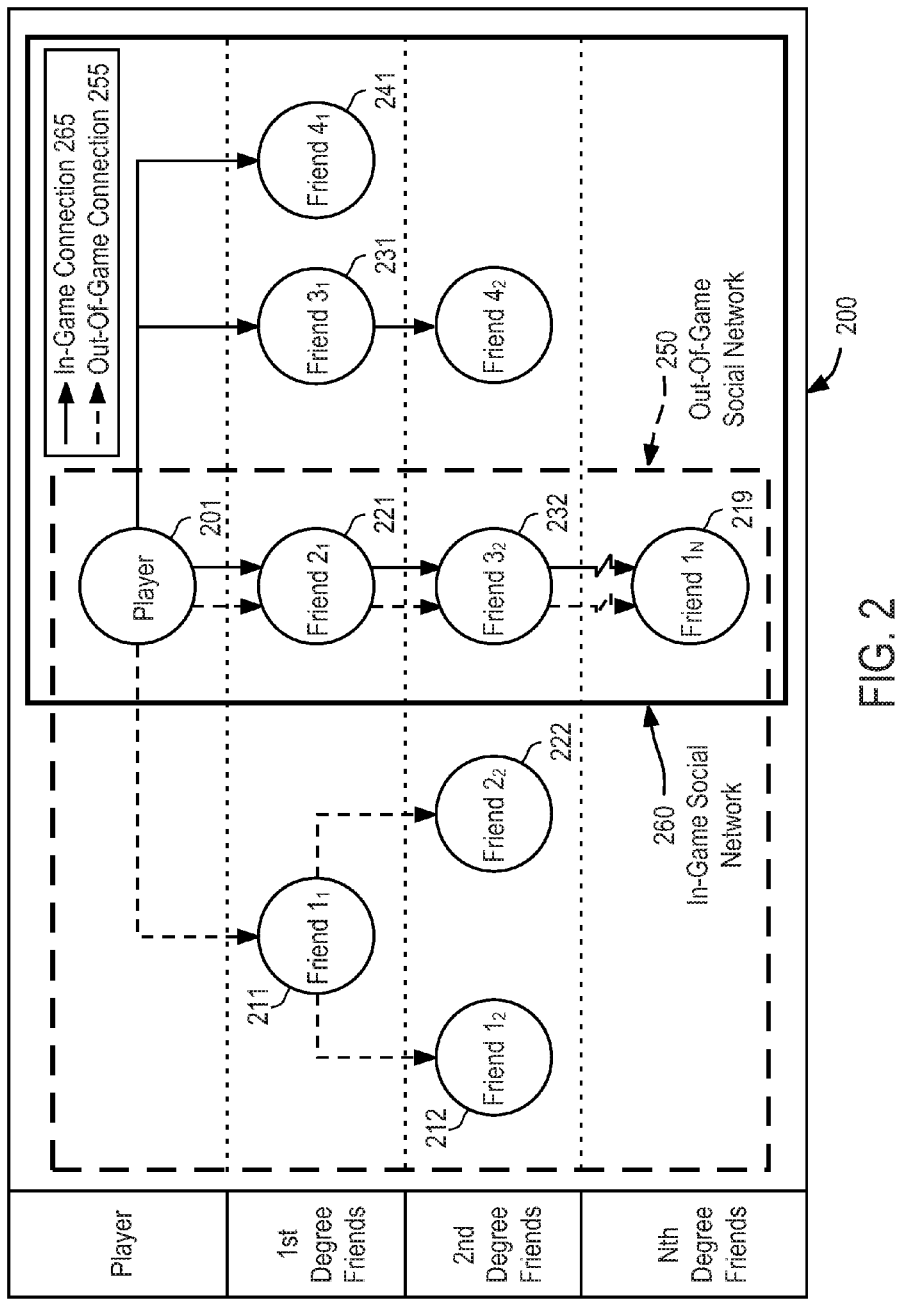
FIG. 2 is a schematic diagram showing an example of a social network within a social graph, according to some embodiments.

FIG. 2 is a schematic diagram showing an example of a social network within a social graph 200. The social graph 200 is shown by way of example to include an out-of-game social network 250, and an in-game social network 260. Moreover, in-game social network 260 may include one or more players that are friends with Player 201 (e.g., Friend 231), and may include one or more other players that are not friends with Player 201. The social graph 200 may correspond to the various players associated with one or more virtual games.

Example of Themes for Game Boards

It is to be appreciated that the virtual game board for a game may be presented to players in a variety of manners. In some embodiments, a game board of a game may be displayed to players in a manner that is relevant to a particular theme. The theme of the game board may be any theme, such as a seasonal theme, a theme related to media (e.g., a movie, a television show, or music), a theme related to pop culture, a theme related to a field of study, and the like. A themed game board may have aesthetic features associated with the theme and may apply game mechanics in a manner that is relevant to the theme of the game board.

In some embodiments, the themed game board may be purchased by a player. In other embodiments, the themed game board may be given to a player after a particular action is taken by the player. For example, a promoter of a product or service may notify a player that the player may receive the themed game board after the player watches a video advertisement promoting the product or service.

Figure 3:
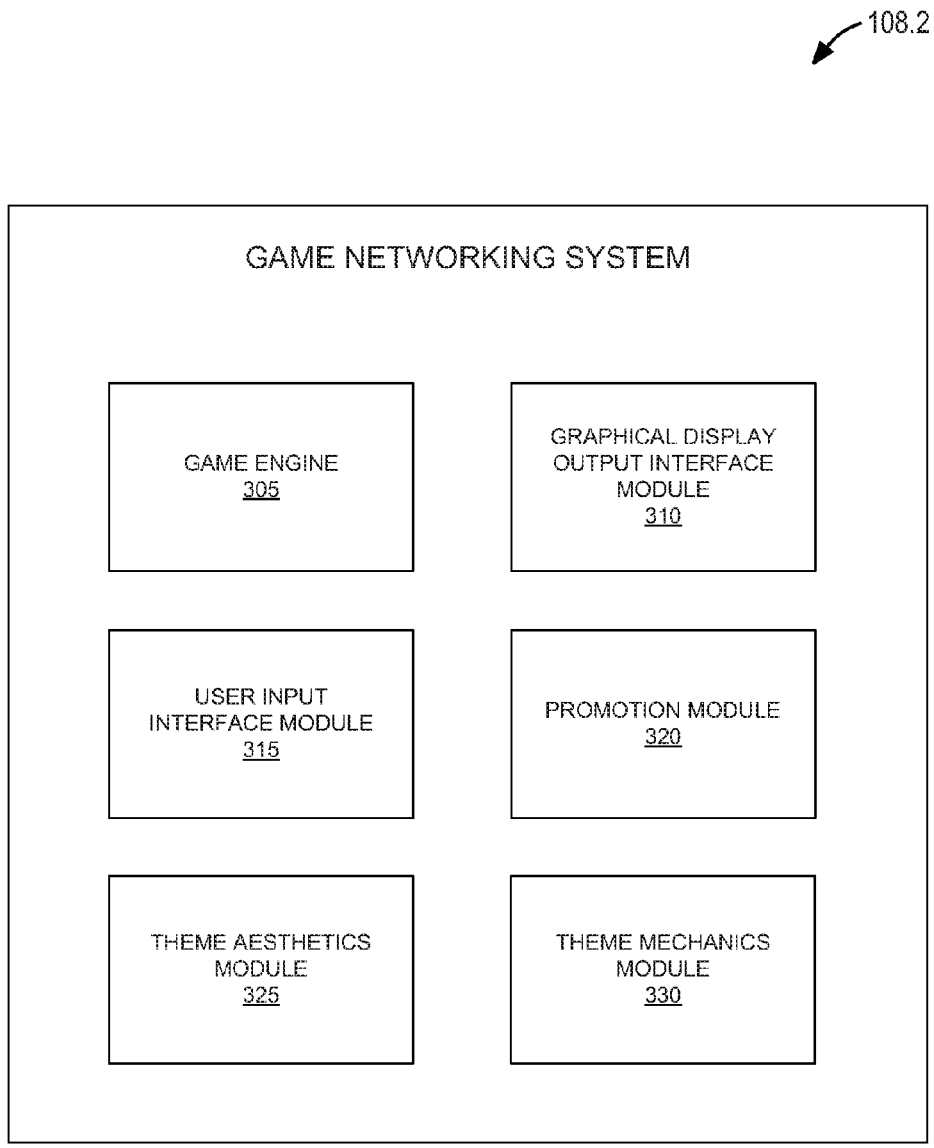
FIG. 3 is a block diagram showing example components of a game networking system, according to some embodiments.

FIG. 3 is a block diagram showing example components of a game networking system 108.2. Game networking system 108.2 may include a game engine 305, a graphical display output interface module 310, a user input interface module 315, a promotion module 320, a theme aesthetics module 325, and a theme mechanics module 330.

The game engine 305 may be a hardware-implemented module which may control any aspects of a game based on rules of the game, including how a game is played, players' actions and responses to players' actions, and the like. The game engine 305 may be configured to generate a game instance of a game of a player and may determine the progression of a game based on user inputs and rules of the game.

The graphical display output interface module 310 may be a hardware-implemented module which may control information or data that is provided to client systems for display on a client device. For example, the graphical user display output module 310 may be configured to provide display data associated with displaying a game instance of a game, including displaying a game board of a game, displaying moves made by players on the game board of the game, and so forth.

The user input interface module 315 may be a hardware-implemented module which may receive user inputs for processing by the game engine 305 based on rules of the game. For example, the user input interface module 315 may receive user inputs indicating functions, such as, for example, a move made by a player, and the like.

The promotion module 320 may be a hardware-implemented module which may manage enrollment and accounts of entities (e.g., a company, a public figure, an organization, and so forth) so that those entities may utilize a theme to promote a particular aspect associated with the entity, such as promotion of the entity itself, a product or service of the entity, and the like. The entity may enroll via the promotion module 320. When a player takes a particular action (e.g., clicks on a specified link, watches a specified advertisement, and so forth), the entity may inform the promotion module 320 that the player may receive a particular themed game board. The promotion module 320 may facilitate payment from the entity for the themed game boards sent to players. In some embodiments, at enrollment, the entity may choose available themed game boards to provide to players, or the entity may create customized game boards to be provided to players via the promotion module 320.

The theme aesthetics module 325 may be a hardware-implemented module which may manage and control aesthetic features associated with themes for game boards. The aesthetic features associated with themes may include any aesthetic features such as sound effects and visual effects (e.g., theme-related backgrounds, shapes of game boards, colors, animation, and the like). When a game board is generated by the game engine 305, the game engine 305 may use the theme aesthetics module 325 to generate the game board such that the game board may be displayed with the aesthetic features corresponding to the selected theme.

The theme mechanics module 330 may be a hardware-implemented module which may manage and control game mechanics associated with themes for game boards. The game mechanics associated with themes may include any mechanics customized for a particular theme. For example, a theme may be associated with a particular set of rules for the game, where the rules are customized for and relate to the theme selected. When a game board is generated by the game engine 305, the game engine 305 may use the theme mechanics module 330 to generate the game board such that the game may be played according to the particular set of rules associated with the theme.

Figure 4:
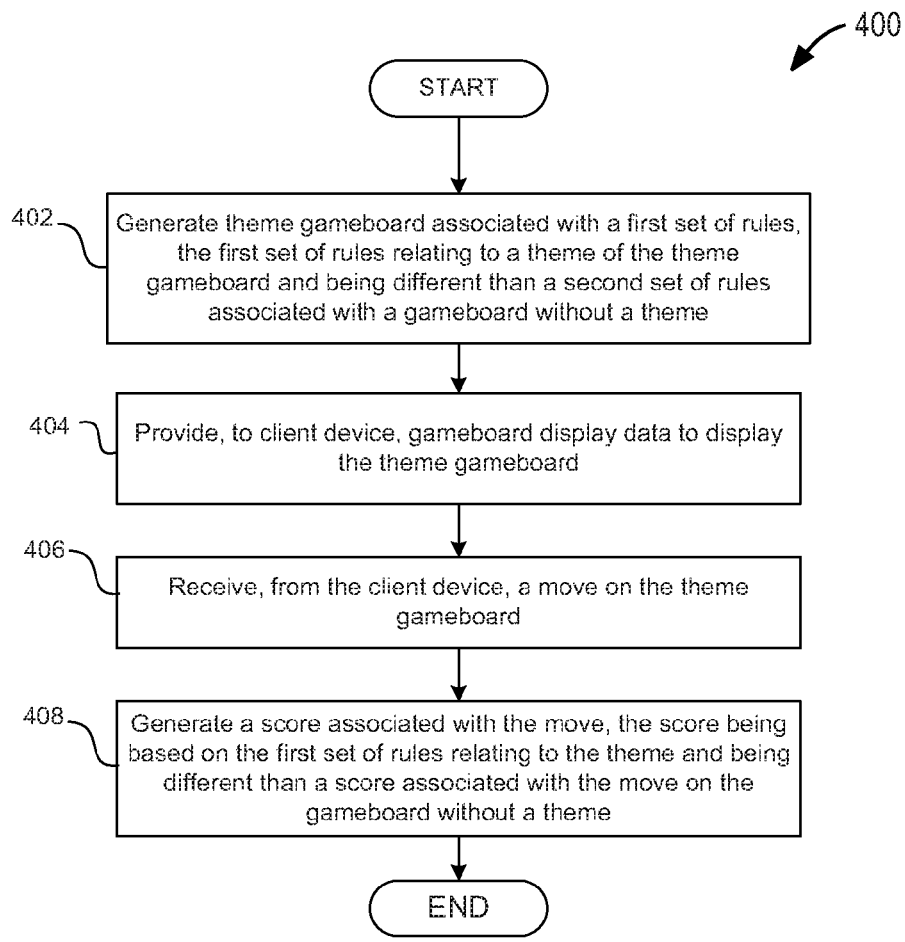
FIG. 4 is a flowchart showing an example method of providing custom features in a game, according to some embodiments.

FIG. 4 is a flowchart showing an example method 400 of providing custom features in a game. When a themed game board associated with custom features is selected for gameplay by a player, in operation 402, the game engine 305 generates the themed game board. The themed game board that is generated is associated with a first set of rules that relate to the theme of the themed game board. The rules that relate to the theme may be different than a second set of rules that is associated with a game board without a theme. For example, a game board with a theme may have customized rules that are relevant to the theme of the game board, and those rules may be different than the rules for a game board without a theme.

In operation 404, the graphical display output interface module 310 may provide game board display data to display the themed game board. The game board display data may be provided to the client device of the player so that the themed game board may be displayed on the client device.

Once the themed game board is displayed on the client device, the players of the game may begin gameplay. In operation 406, the user input interface module 315 may receive, from the client device of the player, a move on the themed game board.

When the move is received, in operation 408, the game engine 305 may access the first set of rules associated with the theme and generate a score associated with the move received from the client device. The score is generated based on the first set of rules relating to the theme and may be different than a score associated with the move on the game board without a theme. For example, in a word-based game, the themed game board may provide a higher score for a theme-related word than the score that would have resulted from the same word on a game board without a theme.

Figure 5:
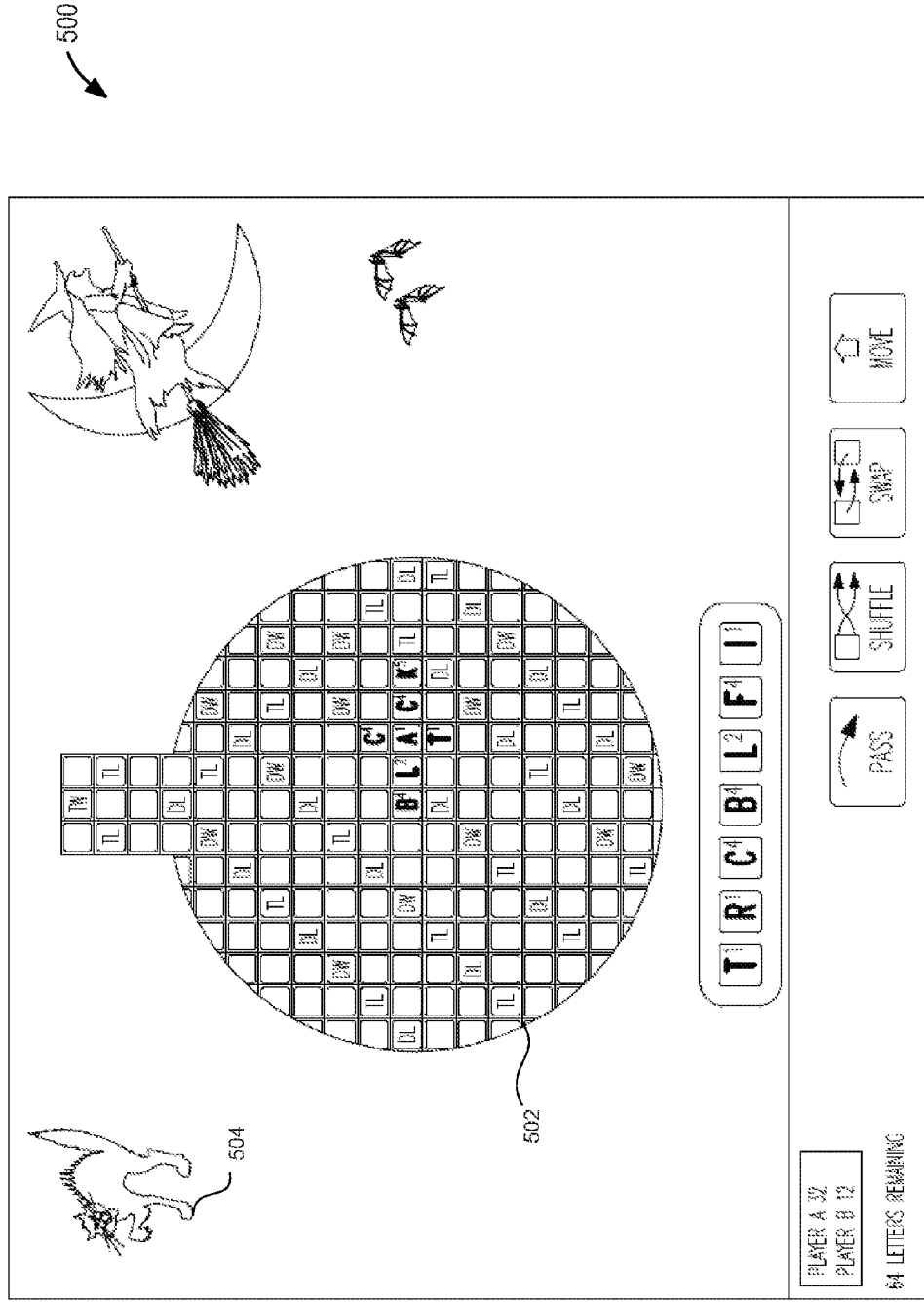
FIG. 5 is an interface diagram illustrating an example game user interface, according to some embodiments.

FIG. 5 is an interface diagram illustrating an example game user interface 500 of a word-based game associated with a theme. In the example of FIG. 5, the themed game board 502 selected by a player is associated with a Halloween theme. As discussed above, the aesthetic features associated with the game board 502 may be any features that are relevant to the selected theme. In the example of FIG. 5, the game board 502 is in the shape of a pumpkin. Additionally, the background of the game user interface 500 includes Halloween-related décor 504. The colors of portions of the game board may include Halloween-related colors, such as black and orange. Sound effects relating to the Halloween theme may also be included. For example, when a player makes a move on the game board 502, a sound effect of a witch's cackle may be produced.

The themed game board 502 may also be associated with any set of rules that are relevant to the Halloween theme. For example, a custom dictionary containing Halloween-related words may be used to determine a score of a move made on the game board. For example, a Halloween-related word (e.g., cat, black) may result in a greater number of points than words that are unrelated to the Halloween theme, or the rules may require that only Halloween-related words may be played on the game board 502. In other examples, a letter tile may provide additional or different amounts of points or additional or different functionality (e.g., a tile that blocks or impedes an opponent on the game board) than the letter tile would typically provide on a game board without a theme. In yet other examples, the spaces on the game board 502 may include additional functionality or provide additional or different amounts of points when those spaces are played. As discussed above, any rules of the game may be customized to reflect the theme of the game board 502.

A themed game board may be provided to a player in any manner. For example, a player may purchase a themed game board using legal or virtual currency, the themed game board may be provided for free or as part of a promotion, or a third-party entity may offer the themed game board to a player as an incentive to take a particular action (e.g., purchase a product, watch a video advertisement, subscribe to a newsletter, and the like). The action to be taken by the player in order for the player to receive the themed game board may be any action specified by the third-party entity.

Figure 6:
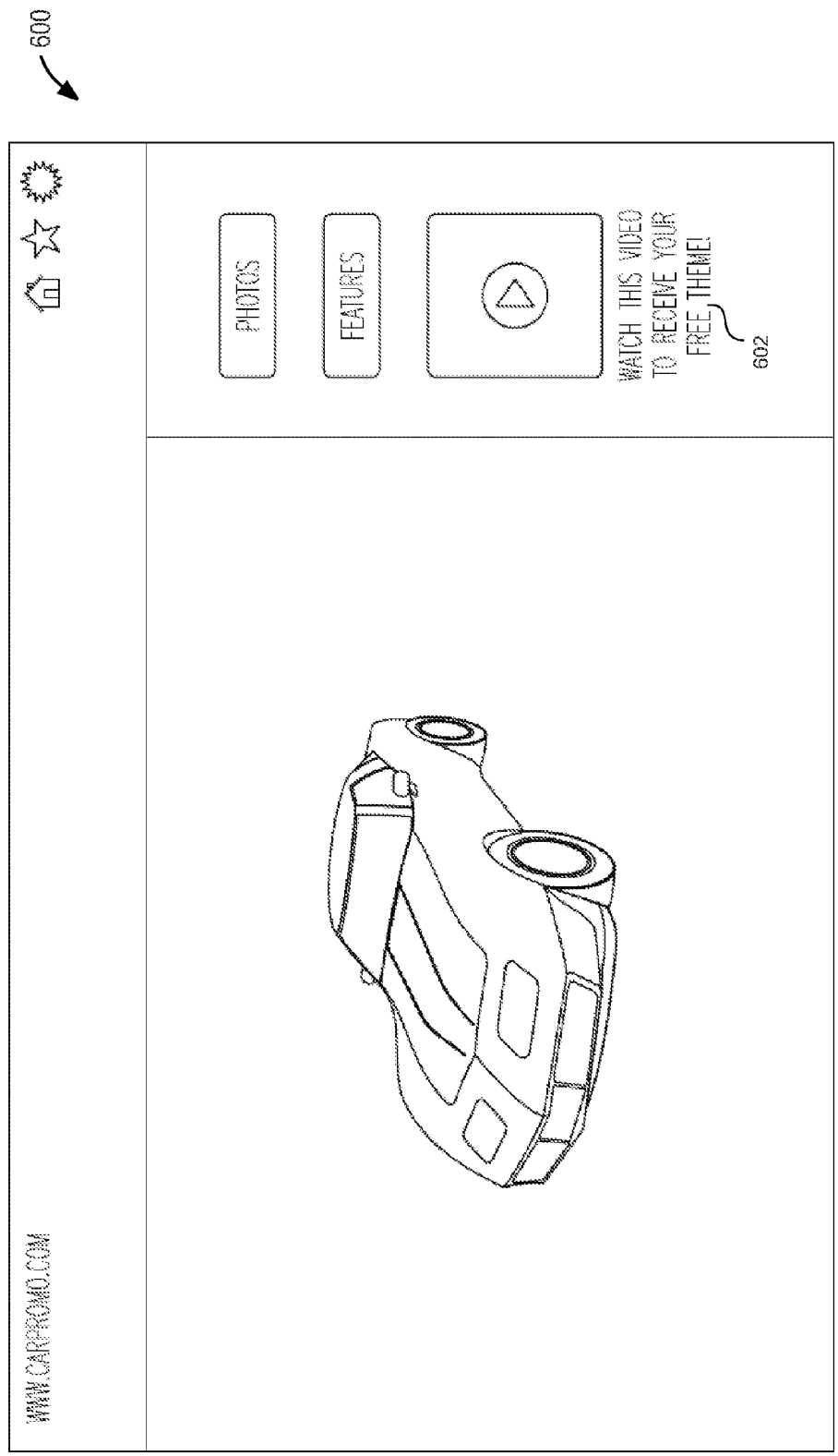
FIG. 6 is an interface diagram illustrating a website of a third-party promoter providing a theme, according to some embodiments.

FIG. 6 is an interface diagram illustrating an example website 600 of a third-party promoter providing a theme to players. When a player visits the website 600 of the third-party promoter, a link 602 may be included on the website 600 which allows a player to watch a video advertisement in order to receive a free themed game board. If the user clicks on the link 602 to watch the video, the player may receive the free themed game board.

Figure 7:
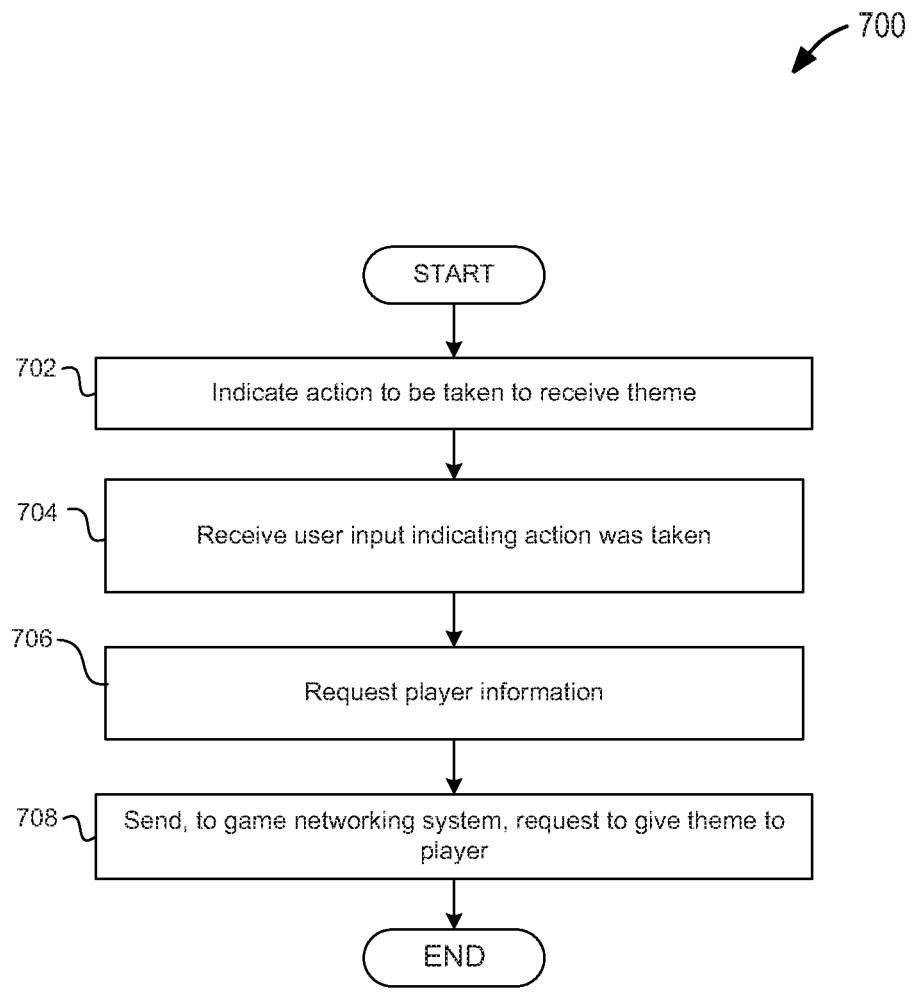
FIG. 7 is a flowchart showing an example method of providing a theme from a third-party promoter to a player, according to some embodiments.

FIG. 7 is a flowchart showing an example method 700 of providing a theme from a third-party promoter to a player. In operation 702, the third-party promoter may indicate an action to be taken to receive the theme. As shown in the example of FIG. 6, the indication may be displayed via the link 602 on the website 600 of the third-party promoter.

In operation 704, the third-party promoter may receive user input indicating the specified action was taken. For example, the user may click on the link 602 for the video advertisement shown in FIG. 6, and the third-party promoter may receive that user input.

When the user input is received and the action has been completed by the player, in operation 706, the third party promoter may request player information from the player. This information may include any information identifying the player, such as the player's user name for the particular game for which the player is to receive the themed game board.

In operation 708, the third party promoter may use the player information received to generate and send a request to give the theme to the player indicated by the player information. The request to give the theme to the player is sent to the game networking system 108.2 so that the game networking system 108.2 may provide the player with the themed game board.

In some embodiments, the themed game board may be a game board relating to the third-party promoter's business. For example, if the third-party promoter is a car company, the theme may be related to a new car the company is selling. In some embodiments, the third-party promoter may send a payment for the theme sent to the player who took the particular specified action.

Figure 8:
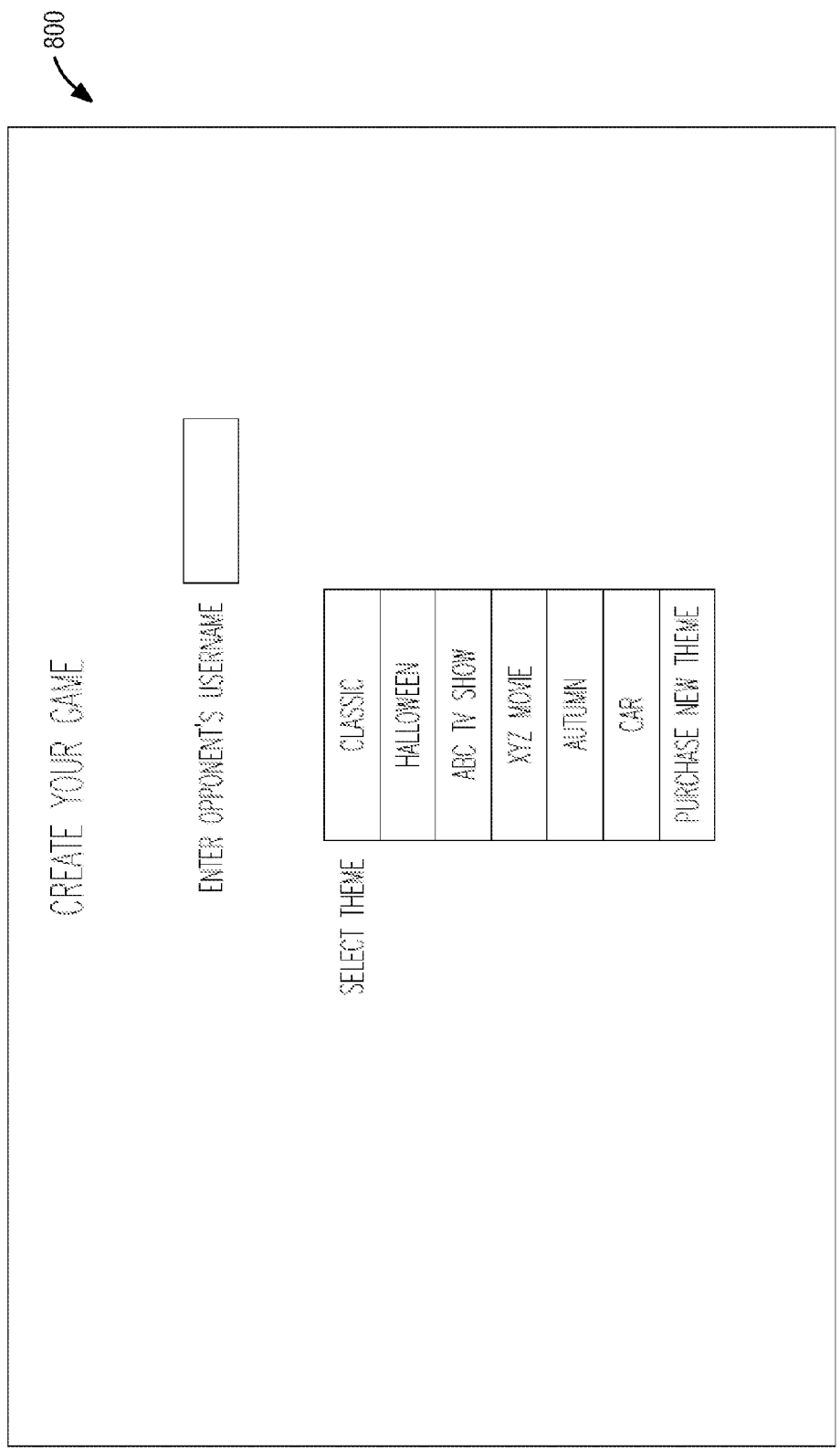
FIG. 8 is an interface diagram illustrating an example user interface for creating a themed game, according to some embodiments.

FIG. 8 is an interface diagram illustrating an example user interface 800 for creating a themed game. When a player wishes to initiate a game against an opponent, the player may create the game by entering the opponent's name in the indicated space.

The user interface 800 may also have an option to select a theme for the game board. The options that appear on the user interface 800 may be themes available to the player. For example, the themes may be themes that the player has received from a third party, themes that are automatically available to the player, or themes that the player has purchased. The player may also have the option to purchase a new theme from a list of themes available for purchase. In some embodiments, the classic option may be associated with a game board without a theme, which may have a standard set of aesthetic features and rules for gameplay. Once the player has selected the opponent and the theme, the game engine 305 may generate the indicated game board, and the players may begin gameplay. The opponent may be notified of the player's request to play against the opponent. In some embodiments, if a themed game board is selected by the player, the opponent may receive the benefit of the theme features, even if the opponent does not have that particular theme available in the opponent's list of available themes.

Storing Game-Related Data

A database may store any data relating to gameplay within a game networking system 108.2. The database may include records for storing a player game state that may include information about the player's virtual game board, the player's character, or other game-related information. For example, player game state may include virtual objects owned or used by the player, placement positions for virtual structural objects on the player's virtual game board, and the like. Player game state may also include in-game objectives for the player (e.g., new objectives, current objectives, completed objectives, etc.), the player's character attributes (e.g., character health, character energy, amount of coins, amount of cash or virtual currency, etc.), and the like.

The database may also include records for storing a player profile that may include user-provided player information that is gathered from the player, the player's client device, or an affiliate social network. The user-provided player information may include the player's demographic information, the player's location information (e.g., a historical record of the player's location during gameplay as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 108.2 may determine the player's friend preferences based on player attributes that the player's first-degree friends have in common, and may store these player attributes as friend preferences in the player profile. Furthermore, the game networking system 108.2 may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during gameplay, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 108.2 may determine the player's likelihood to lead value based on information from other players that interact with this player. For example, the game networking system 108.2 may determine the player's likelihood to lead value by measuring the other players' satisfaction in the virtual game, measuring their satisfaction from their interaction with the player, measuring the game-play frequency for the other players in relation to their interaction frequency with the player (e.g., the ability for the player to retain others), and/or the like.

The game networking system 108.2 may also determine the player's likelihood to lead value based on information about the player's interactions with others and the outcome of these interactions. For example, the game networking system 108.2 may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 108.2 may determine the player's likelihood to lead value based on determining a likelihood for the other players to perform a certain action in response to interacting or communicating with the player and/or the player's virtual environment.

Example Game Systems, Social Networks, and Social Graphs

In a multiplayer game, players control player characters (PCs), a game engine controls non-player characters (NPCs), and the game engine also manages player character state and tracks states for currently active (e.g., online) players and currently inactive (e.g., offline) players. A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on Player A's team (e.g., the friends that are listed as being in the player's mob/gang/set/army/business/crew/etc. depending on the nature of the game) may be playing the virtual game and choose to confront Player B who has 20 friends on Player B's team. In some embodiments, a player may only have first-degree friends on the player's team. In other embodiments, a player may also have second-degree and higher degree friends on the player's team. To resolve the game event, in some embodiments the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Example Game Networking Systems

A virtual game may be hosted by the game networking system 108.2 of FIG. 3, which can be accessed using any suitable connection 110 of FIG. 1 with a suitable client device 104 of FIG. 1. A player may have a game account on the game networking system 108.2, wherein the game account may contain a variety of information associated with the player (e.g., the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of FIG. 1 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 accesses a virtual game and control the game's progress via the client device 104 (e.g., by inputting commands to the game at the client device 104). The client device 104 can display the game interface, receive inputs from the player 102, transmit user inputs or other events to the game engine, and receive instructions from the game engine. The game engine can be executed on any suitable system (such as, for example, the client device 104, the social networking system 108.1 of FIG. 1, the game networking system 108.2, or the communication system 108.3 of FIG. 1). For example, the client device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 accesses particular game instances of a virtual game. A game instance is a copy of a specific gameplay area that is created during runtime. In some embodiments, a game instance is a discrete gameplay area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player is only accessible by that specific player. For example, a first player may access a first game instance when playing a virtual game, and this first game instance may be inaccessible to all other players. In other embodiments, a game instance associated with a specific player is accessible by one or more other players, either synchronously or asynchronously with the specific player's gameplay. For example, a first player may be associated with a first game instance, but the first game instance may be accessed by all first-degree friends in the first player's social network.

In some embodiments, the set of in-game actions available to a specific player is different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine interfaces with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in a multiplayer game.

In some embodiments, the social graph is managed by the game networking system 108.2, which is managed by the game operator. In other embodiments, the social graph is part of a social networking system 108.1 managed by a third party (e.g., Facebook, Friendster, Myspace). In yet other embodiments, the player 102 has a social network on both the game networking system 108.2 and the social networking system 108.1, wherein the player 102 can have a social network on the game networking system 108.2 that is a subset, superset, or independent of the player's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the Player 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to Player 201. As used herein, the terms "player" and "user" can be used interchangeably and can refer to any user in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.1.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a player (or player character) has a social graph within a multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a player's in-game social network are formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (e.g., in disintermediated interactions or the like), but that could be the case.

Figure 9:
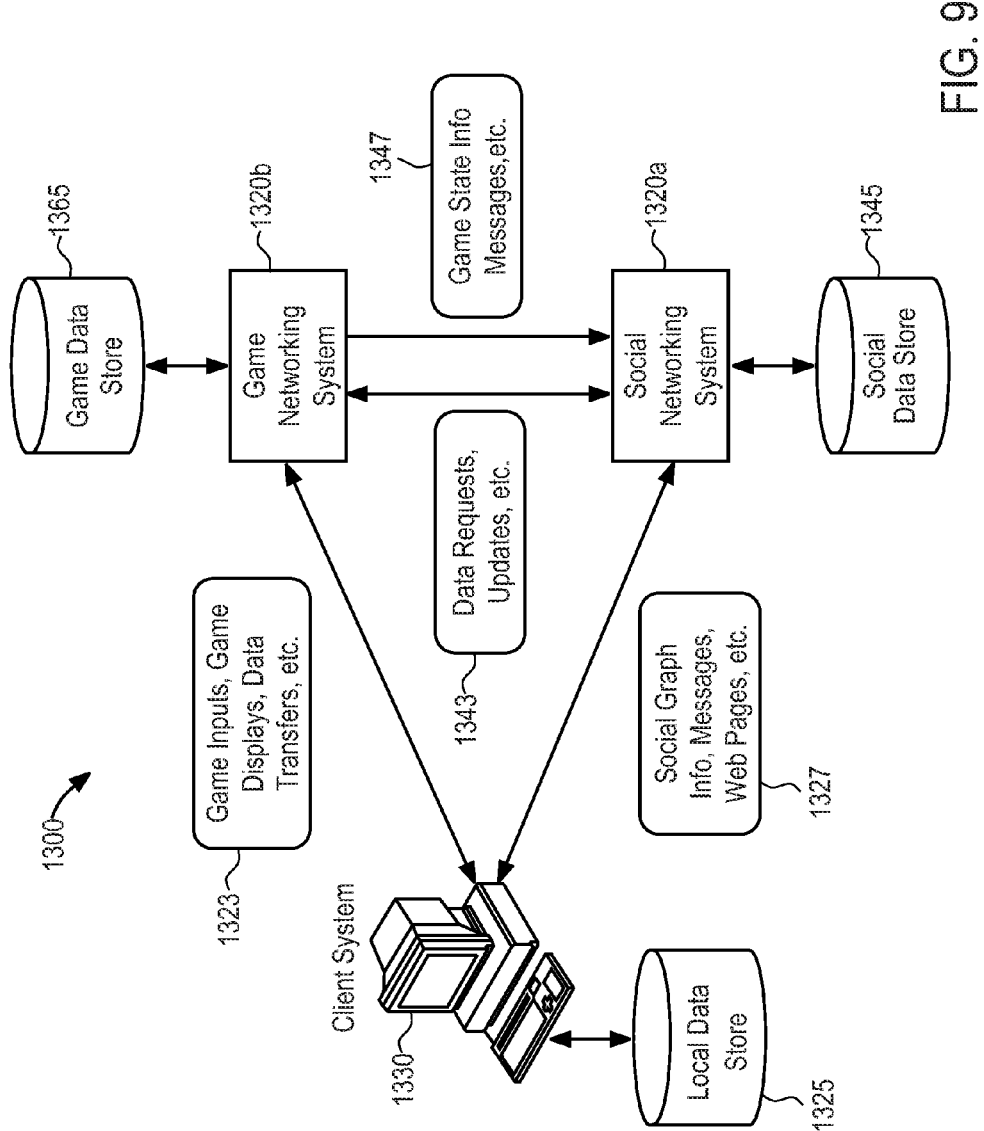
FIG. 9 is a diagrammatic representation of an example data flow between example components of the example system of FIG. 1, according to some embodiments.

FIG. 9 is a diagrammatic representation of an example data flow between example components of an example system 1300. One or more of the components of the example system 1300 may correspond to one or more of the components of the example system 100 of FIG. 1. In some embodiments, system 1300 includes a client system 1330, a social networking system 1320a, and a game networking system 1320b. The components of system 1300 can be connected to each other in any suitable configuration, using any suitable type of connection. The components may be connected directly or over any suitable network. The client system 1330, the social networking system 1320a, and the game networking system 1320b may have one or more corresponding data stores such as the local data store 1325, the social data store 1345, and the game data store 1365, respectively.

The client system 1330 may receive and transmit data 1323 to and from the game networking system 1320b. This data can include, for example, a web page, a message, a game input, a game display, a HTTP packet, a data request, transaction information, and other suitable data. At some other time, or at the same time, the game networking system 1320b may communicate data 1343, 1347 (e.g., game state information, game system account information, page info, messages, data requests, updates, etc.) with other networking systems, such as the social networking system 1320a (e.g., FACEBOOK, MYSPACE, etc.). The client system 1330 can also receive and transmit data 1327 to and from the social networking system 1320a. This data can include, for example, web pages, messages, social graph information, social network displays, HTTP packets, data requests, transaction information, updates, and other suitable data.

Communication between the client system 1330, the social networking system 1320a, and the game networking system 1320b can occur over any appropriate electronic communication medium or network using any suitable communications protocols. For example, the client system 1330, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses a virtual game on the game networking system 1320*b*, the BLOB containing the game state for the instance corresponding to the player may be transmitted to the client system 1330 for use by a client-side executed object to process. In some embodiments, the client-side executable is a FLASH™-based game, which can de-serialize the game state data in the BLOB. As a player plays the game, the game logic implemented at the client system 1330 maintains and modifies the various game state parameters locally. The client-side game logic may also batch game events, such as mouse clicks, and transmit these events to the game networking system 1320*b*. Game networking system 1320*b* may itself operate by retrieving a copy of the BLOB from a database or an intermediate memory cache (memcache) layer. The game networking system 1320*b* can also de-serialize the BLOB to resolve the game state parameters and execute its own game logic based on the events in the batch file of events transmitted by the client to synchronize the game state on the server side. The game networking system 1320*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a player selects one or more actions to perform. The web pages may be displayed in a browser client executed on the client system 1330. For example, a client application downloaded to the client system 1330 may operate to serve a set of web pages to a player. As another example, a virtual game may be an animated or rendered game executable as a stand-alone application or within the context of a webpage or other structured document. In some embodiments, the virtual game is implemented using ADOBE™ FLASH™-based technologies. As an example, a game may be fully or partially implemented as a SWF object that is embedded in a web page and executable by a FLASH™ media player plug-in. In some embodiments, one or more described web pages is associated with or accessed by the social networking system 1320*a*. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at the client system 1330, either caused by an action of a game player or by the game logic itself, the client system 1330 may need to inform the game networking system 1320*b* of the update. For example, if the game is a farming game with a harvest mechanic (such as ZYNGA™ FARMVILLE™), an event can correspond to a player clicking on a parcel of land to harvest a crop. In such an instance, the application event data may identify an event or action (e.g., harvest) and an object in the game to which the event or action applies.

In some embodiments, one or more objects of a game may be represented as any one of an ADOBE™ FLASH™ object, MICROSOFT™ SILVERLIGHT™ object, HTML 5 object, etc. FLASH™ may manipulate vector and raster graphics, and supports bidirectional streaming of audio and video. "FLASH™" may mean the authoring environment, the player, or the application files. In some embodiments, the client system 1330 may include a FLASH™ client. The FLASH™ client may be configured to receive and run FLASH™ application or game object code from any suitable networking system (such as, for example, the social networking system 1320*a* or the game networking system 1320*b*). In some embodiments, the FLASH™ client is run in a browser client executed on the client system 1330. A player can interact with FLASH™ objects using the client system 1330 and the FLASH™ client. The FLASH™ objects can represent a variety of in-game objects. Thus, the player may perform various in-game actions on various in-game objects by making various changes and updates to the associated FLASH™ objects.

In some embodiments, in-game actions are initiated by clicking or similarly interacting with a FLASH™ object that represents a particular in-game object. For example, a player can interact with a FLASH™ object to use, move, rotate, delete, attack, shoot, or harvest an in-game object. This disclosure contemplates performing any suitable in-game action by interacting with any suitable FLASH™ object. In some embodiments, when the player makes a change to a FLASH™ object representing an in-game object, the client-executed game logic may update one or more game state parameters associated with the in-game object. To ensure synchronization between the FLASH™ object shown to the player at the client system 1330, the FLASH™ client may send the events that caused the game state changes to the in-game object to the game networking system 1320*b*. However, to expedite the processing and hence the speed of the overall gaming experience, the FLASH™ client may collect a batch of some number of events or updates into a batch file. The number of events or updates may be determined by the FLASH™ client dynamically or determined by the game networking system 1320*b* based on server loads or other factors. For example, client system 1330 may send a batch file to the game networking system 1320*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to player data or metadata, changes to player social connections or contacts, player inputs to the game, and events generated by the game logic. In some embodiments, each application datum has a name and a value. The value of an application datum may change at any time in response to the gameplay of a player or in response to the game engine (e.g., based on the game logic). In some embodiments, an application data update occurs when the value of a specific application datum is changed.

In some embodiments, when a player plays a virtual game on the client system 1330, the game networking system 1320*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular player and a particular virtual game. In some embodiments, while a player is not playing the virtual game, the corresponding BLOB may be stored in the database. This enables a player to stop playing the game at any time without losing the current state of the game the player is in. When a player resumes playing the game next time, game networking system 1320*b* may retrieve the corresponding BLOB from the database to determine the most-recent values of the game-related data. In some embodiments, while a player is playing the virtual game, the game networking system 1320*b* also loads the corresponding BLOB into a memory cache so that the game system may have faster access to the BLOB and the game-related data contained therein.

Figure 10:
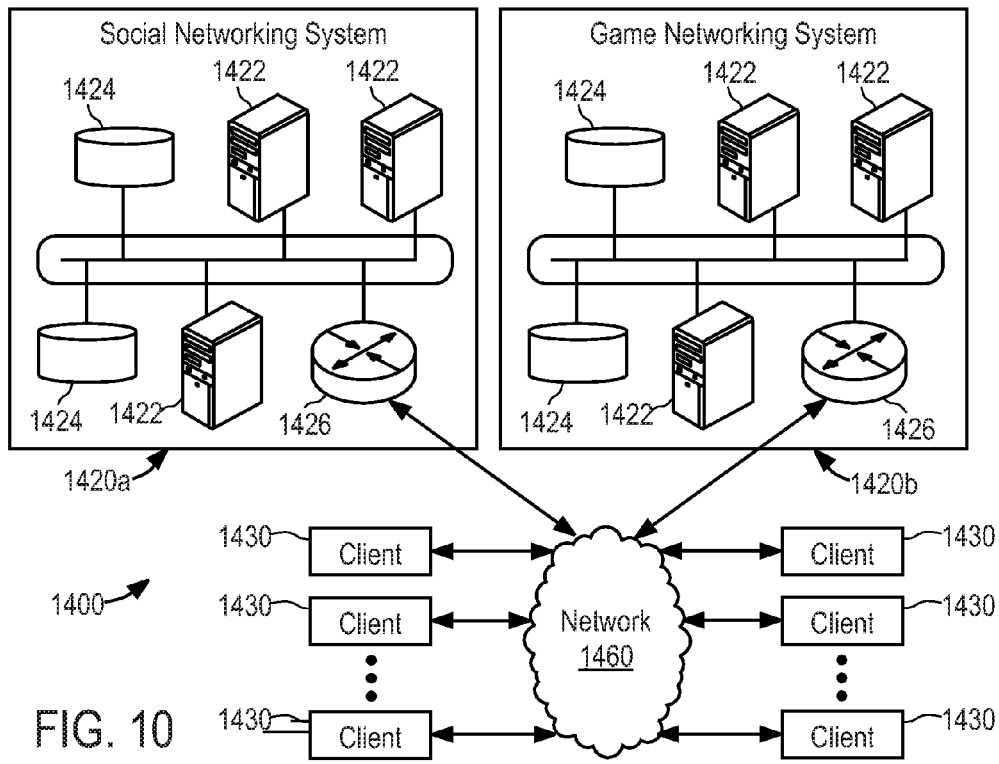
FIG. 10 is a schematic diagram showing an example network environment, in which various example embodiments may operate, according to some embodiments.

Various embodiments may operate in a wide area network environment, such as the Internet, including multiple network addressable systems. FIG. 10 is a schematic diagram showing an example network environment 1400, in which various example embodiments may operate. Network cloud 1460 generally represents one or more interconnected networks, over which the systems and hosts described herein can communicate. Network cloud 1460 may include packet-based wide area networks (such as the Internet), private networks, wireless networks, satellite networks, cellular networks, paging networks, and the like. As FIG. 10 illustrates, various embodiments may operate in a network environment 1400 comprising one or more networking systems, such as a social networking system 1420*a*, a game networking system 1420*b*, and one or more client systems 1430. The components of the social networking system 1420*a* and the game networking system 1420*b* operate analogously; as such, hereinafter they may be referred to simply as the networking system 1420. The client systems 1430 are operably connected to the network environment 1400 via a network service provider, a wireless carrier, or any other suitable means.

The networking system 1420 is a network addressable system that, in various example embodiments, comprises one or more physical servers 1422 and data stores 1424. The one or more physical servers 1422 are operably connected to computer network cloud 1460 via, by way of example, a set of routers and/or networking switches 1426. In an example embodiment, the functionality hosted by the one or more physical servers 1422 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), FLASH™, ActionScript, and the like.

The physical servers 1422 may host functionality directed to the operations of the networking system 1420. Hereinafter servers 1422 may be referred to as server 1422, although the server 1422 may include numerous servers hosting, for example, the networking system 1420, as well as other content distribution servers, data stores, and databases. Data store 1424 may store content and data relating to, and enabling, operation of, the networking system 1420 as digital data objects. A data object, in some embodiments, is an item of digital information typically stored or embodied in a data file, database, or record. Content objects may take many forms, including: text (e.g., ASCII, SGML, HTML), images (e.g., JPEG, TIF and GIF), graphics (vector-based or bitmap), audio, video (e.g., MPEG), or other multimedia, and combinations thereof. Content object data may also include executable code objects (e.g., games executable within a browser window or frame), podcasts, etc.

Logically, data store 1424 corresponds to one or more of a variety of separate and integrated databases, such as relational databases and object-oriented databases, that maintain information as an integrated collection of logically related records or files stored on one or more physical systems. Structurally, data store 1424 may generally include one or more of a large class of data storage and management systems. In some embodiments, data store 1424 may be implemented by any suitable physical system(s) including components, such as one or more database servers, mass storage media, media library systems, storage area networks, data storage clouds, and the like. In one example embodiment, data store 1424 includes one or more servers, databases (e.g., MySQL), and/or data warehouses. Data store 1424 may include data associated with different networking system 1420 users and/or client systems 1430.

The client system 1430 is generally a computer or computing device including functionality for communicating (e.g., remotely) over a computer network. The client system 1430 may be a desktop computer, laptop computer, personal digital assistant (PDA), in- or out-of-car navigation system, smart phone or other cellular or mobile phone, or mobile gaming device, among other suitable computing devices. Client system 1430 may execute one or more client applications, such as a Web browser.

When a user at a client system 1430 desires to view a particular webpage (hereinafter also referred to as target structured document) hosted by the networking system 1420, the user's web browser, or other document rendering engine or suitable client application, formulates and transmits a request to the networking system 1420. The request generally includes a URL or other document identifier as well as metadata or other information. By way of example, the request may include information identifying the user, a timestamp identifying when the request was transmitted, and/or location information identifying a geographic location of the user's client system 1430 or a logical network location of the user's client system 1430.

Although the example network environment 1400 described above and illustrated in FIG. 10 is described with respect to the social networking system 1420*a* and the game networking system 1420*b*, this disclosure encompasses any suitable network environment using any suitable systems. For example, a network environment may include online media systems, online reviewing systems, online search engines, online advertising systems, or any combination of two or more such systems.

Figure 11:
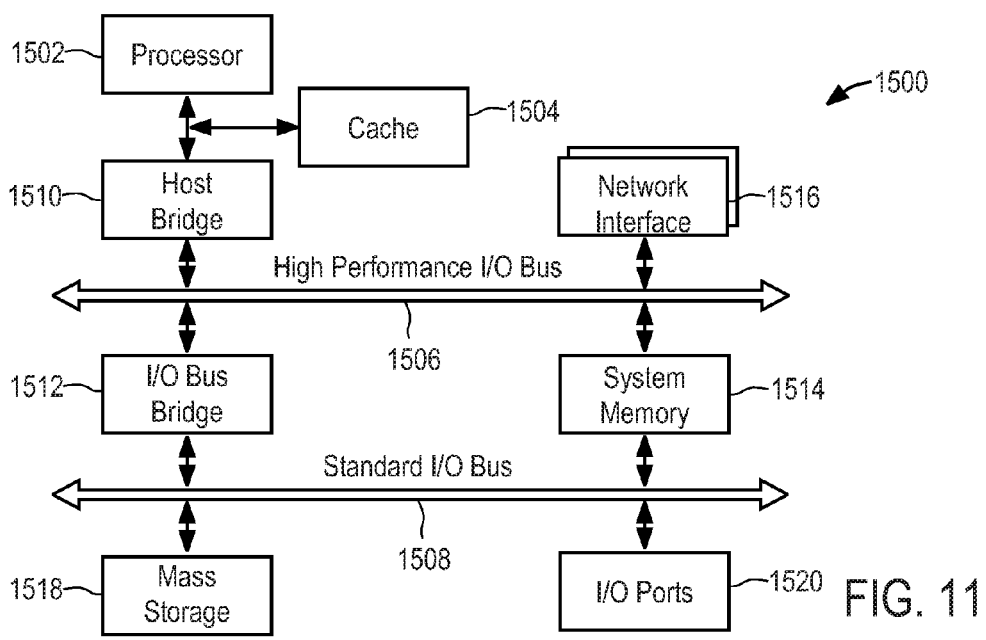
FIG. 11 is a block diagram illustrating an example computing system architecture, which may be used to implement one or more of the methodologies described herein, according to some embodiments.

FIG. 11 is a block diagram illustrating an example computing system architecture, which may be used to implement a server 1422 or a client system 1430 both of FIG. 10. In one embodiment, the hardware system 1500 comprises a processor 1502, a cache memory 1504, and one or more executable modules and drivers, stored on a tangible computer-readable storage medium, directed to the functions described herein. Additionally, the hardware system 1500 may include a high performance input/output (I/O) bus 1506 and a standard I/O bus 1508. A host bridge 1510 may couple the processor 1502 to the high performance I/O bus 1506, whereas the I/O bus bridge 1512 couples the two buses 1506 and 1508 to each other. A system memory 1514 and one or more network/communication interfaces 1516 may couple to the bus 1506. The hardware system 1500 may further include video memory (not shown) and a display device coupled to the video memory. Mass storage 1518 and I/O ports 1520 may couple to the bus 1508. The hardware system 1500 may optionally include a keyboard, a pointing device, and a display device (not shown) coupled to the bus 1508. Collectively, these elements are intended to represent a broad category of computer hardware systems.

The elements of the hardware system 1500 are described in greater detail below. In particular, the network interface 1516 provides communication between the hardware system 1500 and any of a wide range of networks, such as an Ethernet (e.g., IEEE 802.3) network, a backplane, etc. The mass storage 1518 provides permanent storage for the data and programming instructions to perform the above-described functions implemented in servers 1422 of FIG. 10, whereas system memory 1514 (e.g., DRAM) provides temporary storage for the data and programming instructions when executed by the processor 1502. I/O ports 1520 are one or more serial and/or parallel communication ports that provide communication between additional peripheral devices, which may be coupled to the hardware system 1500.

The hardware system 1500 may include a variety of system architectures and various components of the hardware system 1500 may be rearranged. For example, cache memory 1504 may be on-chip with the processor 1502. Alternatively, the cache memory 1504 and the processor 1502 may be packed together as a "processor module," with processor 1502 being referred to as the "processor core." Furthermore, certain embodiments of the present disclosure may neither require nor include all of the above components. For example, the peripheral devices shown coupled to the standard I/O bus 1508 may couple to the high performance I/O bus 1506. In addition, in some embodiments, only a single bus may exist, with the components of the hardware system 1500 being coupled to the single bus. Furthermore, the hardware system 1500 may include additional components, such as additional processors, storage devices, or memories.

An operating system manages and controls the operation of the hardware system 1500, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method comprising, at a game server system configured to provide gaming to one or more user devices:
   receiving a request at the game server system from a third party system to provide a themed game board to a first player, the request provided in response to the first player participating in an activity offered by the third party system, the activity comprising player interaction with sponsored content;
   generating, using the game server system, the themed game board associated with a first set of rules of a computer-implemented game, the first set of rules relating to a theme of the themed game board and being different than a second set of rules associated with a game board without any theme;
   providing, to a first client device of the first player, in response to receiving the request, game board display data to display the themed game board;
   receiving, from the first client device, a move on the themed game board;
   generating a score associated with the move, the score being based on the first set of rules relating to the theme, the score being different than a corresponding score associated with the move on the game board without any theme; and
   causing display of the score in a graphical user interface for the game on the first client device.

2. The method of claim 1, wherein the computer-implemented game is configured to allow gameplay such that a turn of each player playing the computer-implemented game is taken in a manner that is unrestricted by a time limit.

3. The method of claim 1, wherein providing the game board display data includes providing aesthetic display data to display aesthetic features relating to the theme.

4. The method of claim 3, wherein the aesthetic features include a particular shape of the themed game board, the particular shape relating to the theme.

5. The method of claim 1, further comprising:
   providing, to the first client device, sound effects relating to the theme.

6. The method of claim 1, wherein the computer-implemented game is a word-forming game and wherein the first set of rules includes rules relating to a set of words playable on the themed game board, the set of words relating to the theme.

7. The method of claim 1, further comprising:
   receiving, from the first client device of the first player, a selection of the theme from a list of themes available to the first player, wherein generating the themed game board is performed in response to receiving the selection.

8. The method of claim 7, further comprising providing the theme in the list of themes available to the first player.

9. The method of claim 1, further comprising:
   receiving, from the first client device, a payment relating to a purchase of the theme.

10. A non-transitory computer-readable, tangible storage medium storing instructions which, when executed by one or more processors, cause the one or more processors to perform operations, comprising:
    receiving a request at a game server system from a third party system to provide a themed game board to a first player, the request provided in response to the first player participating in an activity offered by the third party system, the activity comprising player interaction with sponsored content, the game server system configured to provide gaming to one or more user devices;
    generating, using the game server system, the themed game board associated with a first set of rules of a computer-implemented game, the first set of rules relating to a theme of the themed game board and being different than a second set of rules associated with a game board without any theme;

providing, to a first client device of the first player, in response to receiving the request, game board display data to display the themed game board;

receiving, from the first client device, a move on the themed game board;

generating a score associated with the move, the score being based on the first set of rules relating to the theme, the score being different than a corresponding score associated with the move on the game board without any theme; and causing display of the score in a graphical user interface for the game on the first client device.

11. The computer-readable, tangible storage medium of claim 10, wherein providing the game board display data includes providing aesthetic display data to display aesthetic features relating to the theme.

12. The computer-readable, tangible storage medium of claim 11, wherein the aesthetic features include a particular shape of the themed game board, the particular shape relating to the theme.

13. The computer-implemented, tangible storage medium of claim 1, wherein the computer-implemented game is a word-forming game and wherein the first set of rules includes rules relating to a set of words playable on the themed game board, the set of words relating to the theme.

14. A game networking system, comprising:
a hardware-implemented theme mechanics module configured to manage rules associated with themes of a computer-implemented game, the rules including a first set of rules relating to a theme and a second set of rules associated with a game board without any theme;

a hardware-implemented receiver configured to receive a request at a game server system from a third party system to provide a themed game board to a first player, the request provided in response to the first player participating in an activity offered by the third party system the activity comprising player interaction with sponsored content;

a hardware-implemented game engine of the game server system, the game server system configured to provide gaming to one or more user devices, the hardware-implemented game engine configured to generate the themed game board associated with the first set of rules relating to the theme of the themed game board, the first set of rules being different than the second set of rules associated with the game board without any theme;

a hardware-implemented display module configured to provide, to a first client device of the first player, in response to receiving the request, game board display data to display the themed game board;

a hardware-implemented user input module configured to receive, from the first client device, a move on the themed game board, wherein the game engine is further configured to generate a score associated with the move, the score being based on the first set of rules relating to the theme, the score being different than a corresponding score associated with the move on the game board without any theme; and a hardware-implemented display module causing display of the score in a graphical user interface for the game on the first client device.

15. The game networking system of claim 14, further comprising:
a hardware-implemented theme aesthetics module configured to manage aesthetics associated with the themes of the computer-implemented game, wherein the game board display data includes aesthetic display data to display aesthetic features relating to the theme.

16. The game networking system of claim 15, wherein the aesthetics include sound effects associated with the themes of the computer-implemented game.

17. The game networking system of claim 14, wherein the computer-implemented game is a word-forming game and wherein the first set of rules includes rules relating to a set of words playable on the themed game board, the set of words relating to the theme.

18. The game networking system of claim 14, wherein the game engine is further configured to receive, from the first client device, a selection of the theme from a list of themes available to the first player, wherein the themed game board is generated in response to receiving the selection.

19. The game networking system of claim 18, wherein the game engine is further configured to provide the theme in the list of themes available to the first player.

20. The game networking system of claim 14, further comprising:
a hardware-implemented promotion module configured to receive, from a third party, a request to create the theme.

* * * * *

UNITED STATES PATENT AND TRADEMARK OFFICE
CERTIFICATE OF CORRECTION

PATENT NO.         : 9,849,370 B2
APPLICATION NO.    : 14/984479
DATED              : December 26, 2017
INVENTOR(S)        : Graham et al.

Page 1 of 1

It is certified that error appears in the above-identified patent and that said Letters Patent is hereby corrected as shown below:

In the Specification

In Column 19, Line 15, delete "(APIs).)" and insert --(APIs)).-- therefor

In the Claims

In Column 21, Line 22, in Claim 13, delete "claim 1," and insert --claim 10,-- therefor In Column 21, Line 37, in Claim 14, delete "system" and insert --system,-- therefor Signed and Sealed this
Twenty-first Day of April, 2020

Andrei Iancu
*Director of the United States Patent and Trademark Office*